United States Patent [19]

Johnson

[11] 3,890,706

[45] June 24, 1975

[54] ROVING CUTTER FOR FIBER REINFORCED SYNTHETIC RESIN SPRAYERS

[76] Inventor: Jay Johnson, 5350 Jessen Dr., LaCanada, Calif. 91011

[22] Filed: Aug. 24, 1973

[21] Appl. No.: 391,208

[52] U.S. Cl. .................. 30/180; 30/347; 83/347
[51] Int. Cl. ............................... B26b 17/00
[58] Field of Search ............ 30/180, 292, 349, 356, 30/347; 83/675, 673, 346, 347; 76/107 C; 93/58.2 R, 58.2 F, 58.4

[56] References Cited
UNITED STATES PATENTS

| | | | |
|---|---|---|---|
| 1,577,620 | 3/1926 | Gammeter | 83/346 X |
| 2,341,503 | 2/1944 | LaBombard | 83/673 X |
| 3,103,304 | 9/1963 | Nawalanic | 30/180 X |
| 3,119,312 | 1/1964 | Henc | 83/347 X |

FOREIGN PATENTS OR APPLICATIONS 1,221,539  2/1971  United Kingdom.................. 30/347

Primary Examiner—Al Lawrence Smith
Assistant Examiner—J. C. Peters

[57] ABSTRACT

A cutter in which a first roller having a plurality of projecting cutting edges is in rolling contact with a second roller having a surface of resilient material. The cutting edges are provided by a plurality of flat spring members which are sprung into arcuate shape and inserted in curved slots in the first roller, straightening action of the spring members acting to lock the members in the slots.

2 Claims, 5 Drawing Figures

PATENTED JUN 24 1975

3,890,706

ROVING CUTTER FOR FIBER REINFORCED SYNTHETIC RESIN SPRAYERS

FIELD OF THE INVENTION

This invention relates to roving cutters for cutting fibrous materials into short lengths, and more particularly, is concerned with a cutter wheel having easily replaceable cutter blades.

BACKGROUND OF THE INVENTION

The use of spray guns for forming fiber reinforced plastic articles is well known. Loose chopped fibers of fiberglass, for example, are mixed with a bonding resin as it is applied to a mold. The chopped fibers are commonly formed by a cutter which receives the fiberglass in the form of a rope-like material or roving. The roving is fed through a rotary cutter that chops the roving into short lengths which can be blown into the spray of resin material from the gun. A spray gun of this type which includes a cutter for chopping reinforcing fiberglass fibers from a continuous roving is described in U.S. Pat. No. 3,330,484. The cutter includes a pair of rollers which are in rolling contact with each other. One roller has a surface of a resilient plastic material or rubber while the other roller is provided with a pluralilty of circumferentially spaced cutter blades. As the roving is fed between the two rotating rollers, the cutting edges of the blades sever the strands of the roving into short lengths of individual fibers that are picked up by a stream of air and directed into the resin spray pattern.

Because glass is a relatively hard material, the cutter edges experience considerable wear and must be replaced from time to time. It has been the practice in the past to provide individual cutter blades which can be removed from the roller and replaced when the cutting edges become too worn to function effectively. Some types of releasable clamping means had to be provided for securing each blade in position on the roller. In some instances this has been done by providing set screws for clamping the cutter blades in slots in the roller. Loosening of the set screws requires removal of the roller from the cutter assembly and is a time-consuming operation, particularly because the heads of the set screws become clogged with bits of material from the roving and must be cleaned out to insert the socket wrench. Because the cutter roller may be only an inch in diameter, for example, it will be appreciated that the individual set screws are very small. Furthermore, the positive clamping action of the set screws provides a very rigid support for the individual cutter blades, making them susceptible to chipping or breaking in use.

To avoid the problems inherent in the use of set screws, cutters have heretofore been provided in which the individual cutter blades are locked into slots in the roller by means of spring elements which are used to wedge each cutter blade against one surface of the slot. This arrangement has the advantage that there is some give to the springs, reducing the chipping and breaking problem encountered in the more rigid mounting by the set screws. However, the removal of the individual blades and insertion of new blades together with the wedging springs is an awkward and time-consuming operation.

SUMMARY OF THE PRESENT INVENTION

The present invention is directed to an improved cutter utilizing a roller having removable cutter blades in which the blades can be easily replaced without removing the roller from the cutter assembly. This is accomplished, in brief, by providing a cutter roller having a cylindrical outer surface which is in rolling contact with the outer surface of another roller having a resilient outer surface. The first roller is provided with a plurality of axially extending slots spaced around the periphery thereof, the slots being curved in an arc along their length. Cutter blades are formed from flat spring material that can be deflected into a curved shape and inserted into an individual slot. The blades are locked in the slots by the restoring action of the spring material of the blades, which wedges the blades in the arcuate slots.

DESCRIPTION OF THE DRAWINGS

For a more complete understanding of the invention reference should be made to the accompanying drawings, wherein.

DETAILED DESCRIPTION

Figure 1:
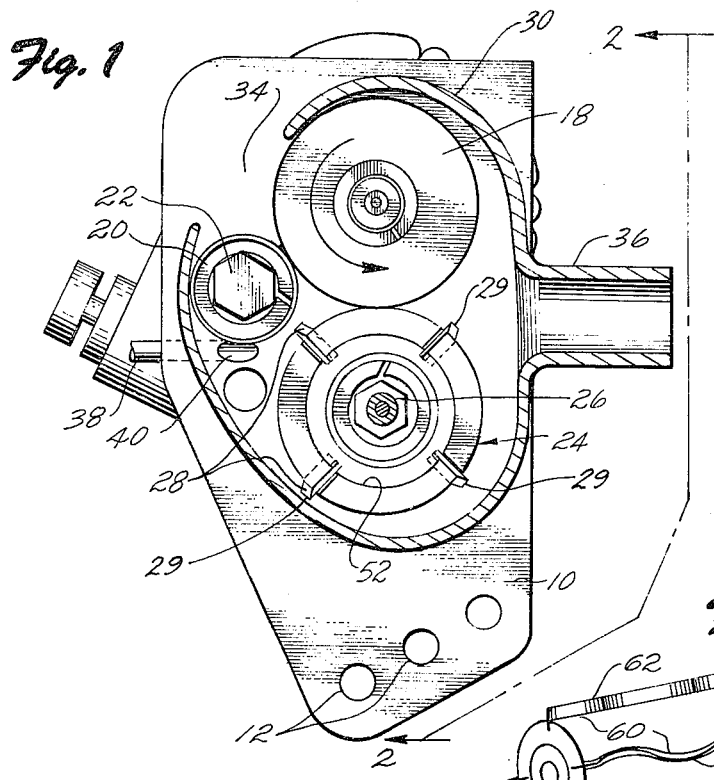
FIG. 1 is an elevational view of the cutter assembly with the cover in section.

Referring to the drawings in detail, the numeral 10 indicates generally a frame plate for the cutter assembly. The lower end of the frame plate is provided with a series of holes 12 by means of which the cutter assembly can be bolted to the housing of a sprayer, in the manner shown in the above-identified patent. Mounted on one side of the frame plate 10 is a motor 14 having an output shaft 16 which extends through an opening in the frame plate 10. The motor 14 may be either an electric or pneumatically-operated motor, for example.

Mounted on the end of the motor shaft 16 and rotated thereby is a roller 18 which has an outer cylindrical surface formed of a resilient material, such as rubber. Positioned adjacent the drive roller 18 is a feed roller 20 which is journaled on a stud 22 that is secured to the frame plate 10. The roving of fiberglass material is fed between the adjacent surfaces of the drive roller 18 and feed roller 20, the resilient surface of the drive roller 18 engaginig the roving material to continuously draw the roving material into the cutter assembly.

Also in rolling contact with the drive roller 18 is a cutter roller 24 which is journaled on a stud 26 that in turn is secured to the frame plate 10. The cutter roller 24 has an outer cylindrical surface which is in rolling contact with the resilient cylindrical surface of the drive roller 18. A plurality of circumferentially spaced cutter blades 28 are mounted around the periphery of the cutter roller 24 in a manner hereinafter described in detail. Each blade forms a projecting cutting edge 29 that is pressed against the resilient material of the drive roller 18. As the roving is drawn in through the drive roller 18 and the feed roller 20, it is chopped off by the succession of cutter blades 28 as the cutter roller 24 is rotated by the drive roller 18.

The three rollers are enclosed by a removable cover 30 held in place by a nut 32 which engages a threaded extension of the stud 26. The cover 30 is provided with an opening 34 through which the roving is fed. The cover is further formed with a nozzle portion 36 through which the chopped fiberglass is discharged. An air hose 38 connects a source of compressed air through an opening 40 in the frame plate 10. The opening 40 is positioned such that air is directed toward the nozzle 36 to form a continuous flow or movement of air which lubricates and guides the chopped fiberglass material out of the nozzle.

Figure 3:
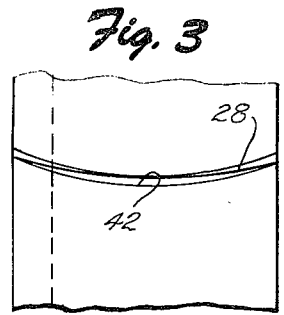
FIG. 3 is a detailed view of a portion of the cutter roller showing one cutter blade.

As thus far described, except for the mounting of the cutter blades in the cutter roller 24, the chopper assembly corresponds to the chopper assembly described in the above-identified patent. According to the present invention, the cutter roller 24 is provided with a plurality of circumferentially spaced slots, four slots being shown by way of example at 42. The slots 42 are formed in the outer cylindrical periphery of the roller 24 and extend in an axial direction the full width of the roller. The slots are arcuate in shape. Inserted in each slot is the cutter blade 28. The cutting edge 29 projects outwardly beyond the cylindrical outer surface of the roller 24. Each cutter blade is made of a thin spring steel similar to the conventional injector razor blade. The width of the slot 42 is slightly greater than the thickness of the blade 28. The blade is inserted in the slot 42 by bending the blade, as by squeezing the edges of the blade together slightly, to deform the blade into a curved shape corresponding to the arcuate shape of the slot, thus permitting the blade to be easily inserted into the slot. Once in position, the edges of the blade are released permitting it to try to spring back to its initial shape, constrained only by the margins of the slot. As seen in FIG. 3, the outer ends of each blade 28 contact one margin of the slot while the center of the blade is in contact with the opposite margin of the slot; thus the spring action of the blade itself locks the blade into the slot.

An alternative way of inserting the blades 28 with the cutter roller 24 in place in the assembly is to insert one end of the blade into the slot adjacent the margin of the slot nearest the frame 10. Lateral pressure against the blade 28 at the opposite end curves the blade into the shape necessary for it to slip easily down into the slot over the remaining length of the blade. In this way it is not necessary to remove the cutter roller 24 to insert new blades into the slots.

For removal of the blades 28, the outer end of the cutter roller 24 is counterbored as indicated at 50, leaving an undercut edge 52 at a radius greater than the radius of the bottom of the slots 42. This allows one end of the blade 28 to be exposed at the inner edge 54. This permits a screwdriver or other metal tool to be used to lift one end of the blade partially out of the slot 42, making it easier to grip the projecting edge of the blade and withdrawing it entirely from the slot.

In addition to the advantage of providing an easily removable yet securely held cutter blade, the arcuate slot has the advantage that, as the cutter roller 24 rotates, the center of the cutting edge 29 comes in contact with the driver roller 18 first, and leaves contact at the two outer extremities of the blade. This arrangement means that the additional torque load imposed upon the drive roller 18 by the projecting blades 28 is distributed over a large angle of rotation than if the blades were straight and contacted the drive roller 18 over the full length of a blade simultaneously. This is particularly important in reducing the static load imposed on the motor when starting up. There is less tendency for the rollers to jam because the starting torque might be insufficient to move the blade past its position of contact with the drive roller.

Figure 5:
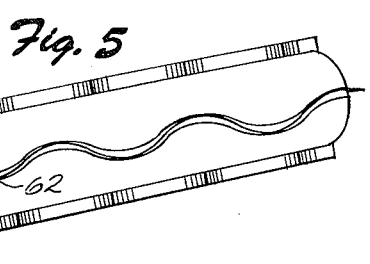
FIG. 5 is a perspective view of an alternative cutter roller.
Figure 2:
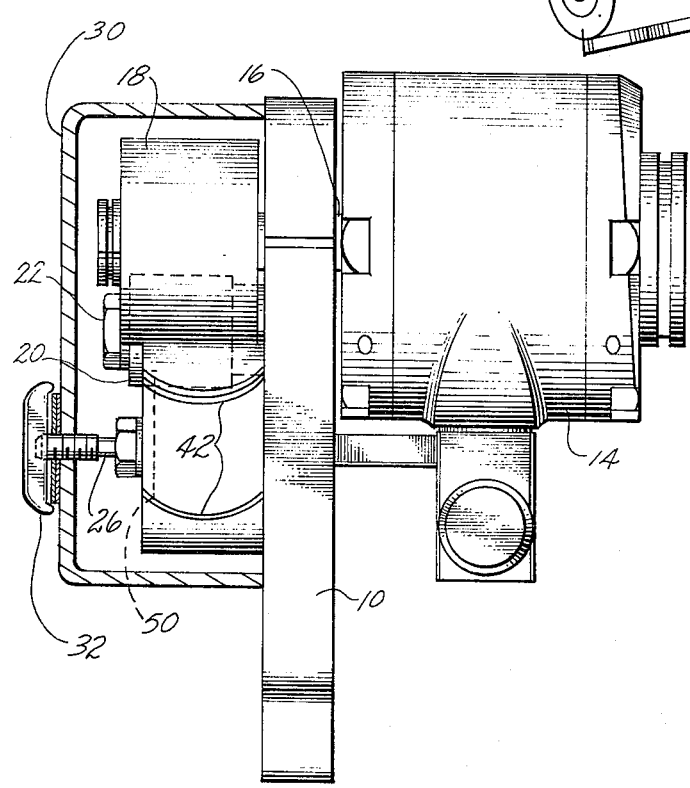
FIG. 2 is an end view of the cutter assembly with the cover in section.

The above-described cutter assembly is particularly designed for use in hand sprayers of resin materials. However, in forming flat stock or wide sheets of standard reinforced plastic materials, it is customary to apply the fibers and resin over a wide swath. In such case, the fiberglass material may be chopped from parallel strands extending over the full width of the sheet being formed. In this case the cutter might be in the form of an elongated drum with cutter blades extending the full axial length of the drum. FIG. 5 shows such a cutter arrangement. Instead of the axially extending slots being in the form of a single arc, the slots are formed in serpentine fashion along their axial extent. Each cutter blade is formed of elongated ribbon of flat spring material which is also formed into a serpentine shape and inserted in an elongated slot. In attempting to assume its natural straight shape, the serpentine blade 62 locks itself into the slot 60.

Figure 4:
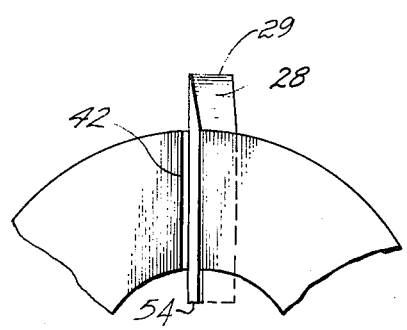
FIG. 4 is an end view of a portion of the cutter roller showing a single cutter blade.

It will be seen that in both the cutter arrangement of FIGS. 3 and 4 and the cutter arrangement of FIG. 5, the projecting edge of the blade is resiliently supported because the blade is thinner than the slot in which it is positioned. This reduces the chance of breaking or chipping of the cutting edges. It will be further appreciated that although the blade cutter has been shown and described as being useful in a fiberglass chopper for use in forming reinforced resin materials, the construction of the cutter wheel with its removable blades is suitable for a wide range of applications.

I claim:

1. An improved cutter wheel for use in a cutter for chopping rovings of fibrous material, comprising an elongated cylindrical member having at least one radial slot extending transversely between the ends of the cylindrical member, said slot having a convex surface longitudinally in an arc over at least a portion of the length thereof in the direction of the axis of revolution of the cylindrical member, and a cutter blade of straight spring material positioned in the slot and having a sharp cutting edge along one elongated edge projecting radially outwardly from the cylindrical member, the width of the slot being greater than the thickness of the blade, the blade being held in a flexed curved shape against said convex surface when inserted in the slot by bending the blade, the blade being locked in the slot merely by the straightening action of the spring blade producing a lateral force pressing the center portion of the blade against said convex surface and the ends of the blade against the opposite surface of the slot.

2. An improved cutter wheel comprising an elongated cylindrical member having at least one radial slot extending transversely between the ends of the cylindrical member, said slot having a convex surface longitudinally in an arc over at least a portion of the length thereof in the direction of the axis of revolution of the cylindrical member, and a cutter blade slightly positioned in the slot and having a sharp cutting edge along one elongated edge projecting radially outwardly from the cylindrical member, the cutter blade being made of straight thin spring material, the blade being held in a flexed curved shape against said convex surface when inserted in the slot by bending the blade, the blade being locked in the slot by the straightening action of the spring blade producing a lateral force pressing the center portion of the blade against said convex surface and the ends of the blade against the opposite surface of the slot, and the cylindrical member being recessed at one end to expose the inner edge of one end of the blade when the blade is inserted in the slot.

* * * * *